United States Patent
Kobayashi

(10) Patent No.: US 6,882,118 B2
(45) Date of Patent: Apr. 19, 2005

(54) DISCHARGE LAMP STARTING DEVICE AND ILLUMINATION APPARATUS

(75) Inventor: Masami Kobayashi, Hiratsuka (JP)

(73) Assignee: Harison Toshiba Lighting Corp., Imabari (JP)

( * ) Notice: Subject to any disclaimer, the term of this patent is extended or adjusted under 35 U.S.C. 154(b) by 0 days.

(21) Appl. No.: 10/693,230

(22) Filed: Oct. 23, 2003

(65) Prior Publication Data

US 2004/0124789 A1 Jul. 1, 2004

(30) Foreign Application Priority Data

Dec. 25, 2002 (JP) ........................................ 2002-375117
Dec. 25, 2002 (JP) ........................................ 2002-375118

(51) Int. Cl.[7] .............................................. H05B 37/00
(52) U.S. Cl. .................... 315/291; 315/209 R; 315/224
(58) Field of Search ................................ 315/224, 225, 315/307, 291, 308, 219, 200 R, 209 R

(56) References Cited

U.S. PATENT DOCUMENTS 5,055,746 A * 10/1991 Hu et al. ..................... 315/291
5,291,100 A * 3/1994 Wood .......................... 315/307
5,933,340 A * 8/1999 Adamson ................. 315/209 R
6,008,589 A * 12/1999 Deng et al. .............. 315/209 R
6,097,158 A * 8/2000 Manor et al. ............ 315/200 R

FOREIGN PATENT DOCUMENTS

JP 11204280 7/1999
JP 160497 6/2001

* cited by examiner

Primary Examiner—Wilson Lee
(74) Attorney, Agent, or Firm—John P. White; Cooper & Dunham LLP

(57) ABSTRACT

A discharge lamp driving circuit drives a discharge lamp using a high frequency wave, to start the lamp. A booster/chopper circuit has a switching element FET1, and boosts an input power supply voltage by switching the switching element. A boosting transformer supplies the discharge lamp with the voltage boosted by the booster/chopper circuit. A booster/driver circuit supplies the switching element FET 1 of the booster/chopper circuit with a driving signal having a frequency of 10 to 200 kHz, thereby limiting the peak loss of the switching element FET 1 to 200 W or less.

16 Claims, 6 Drawing Sheets

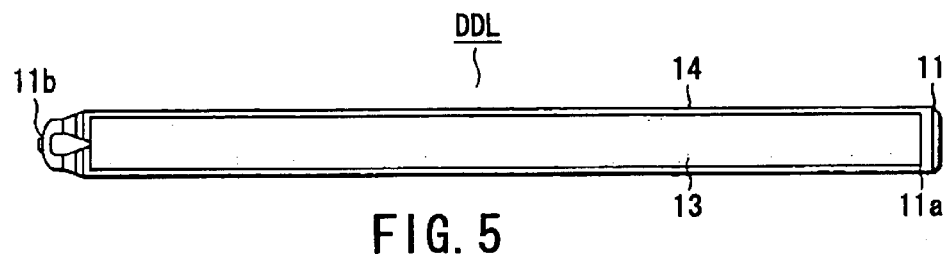
FIG. 5
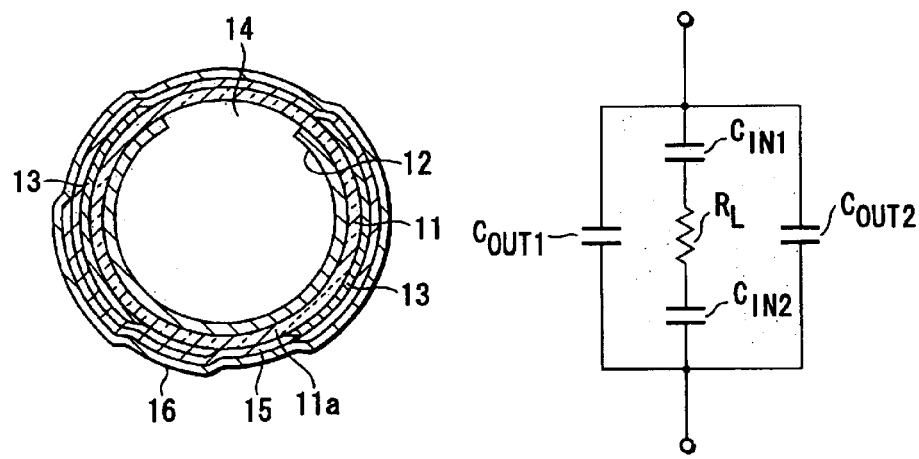
FIG. 6
FIG. 7
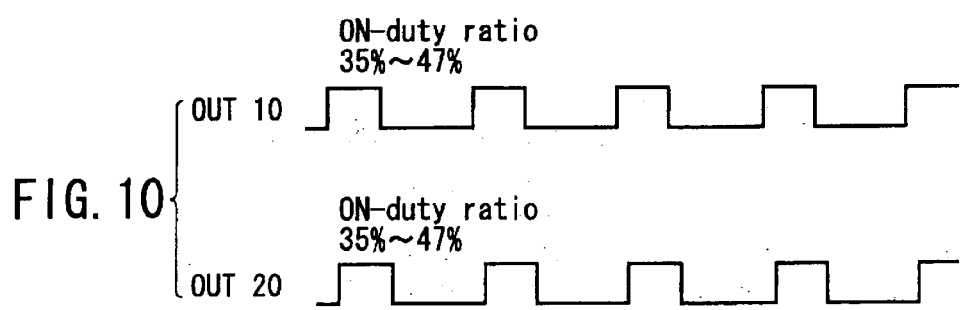
FIG. 10

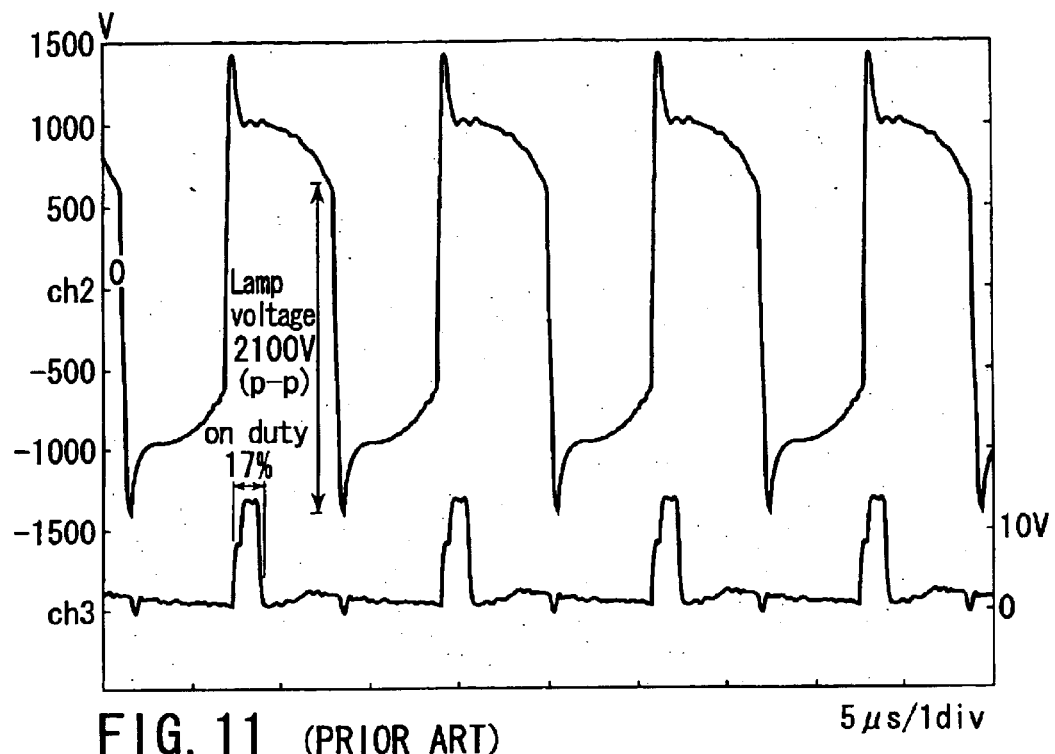
FIG. 11 (PRIOR ART)     5μs/1div
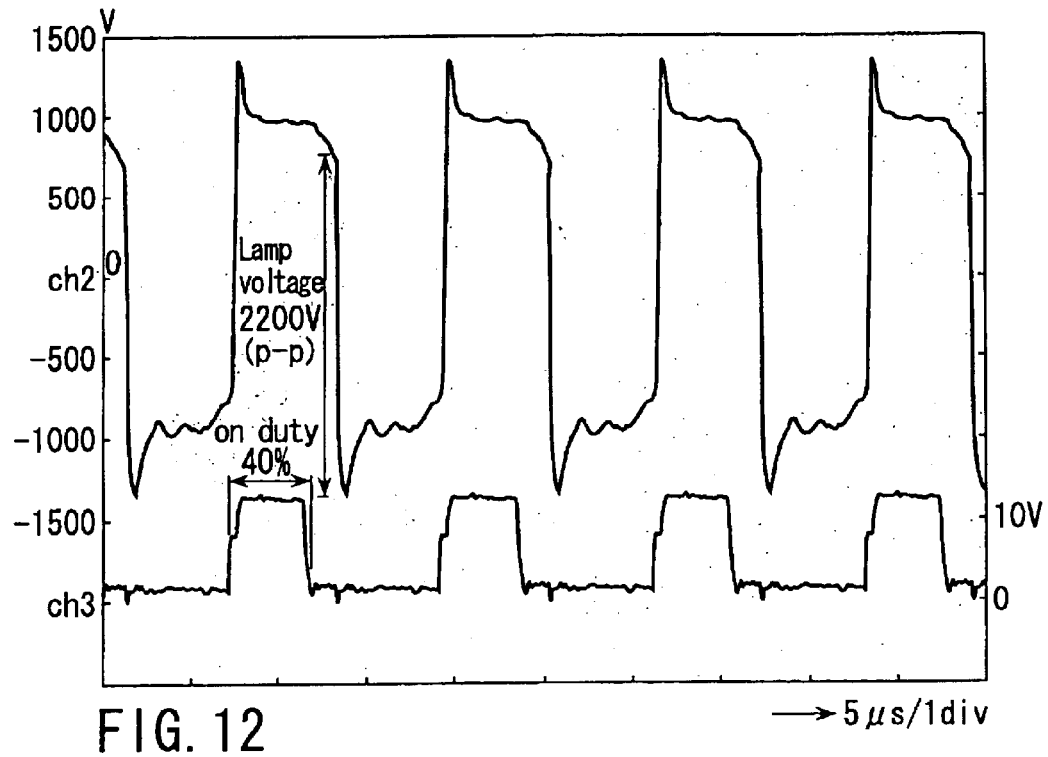
FIG. 12     →5μs/1div

US 6,882,118 B2

DISCHARGE LAMP STARTING DEVICE AND ILLUMINATION APPARATUS

CROSS-REFERENCE TO RELATED APPLICATIONS

This application is based upon and claims the benefit of priority from the prior Japanese Patent Applications No. 2002-375117, filed Dec. 25, 2002; and No. 2002-375118, filed Dec. 25, 2002, the entire contents of both of which are incorporated herein by reference.

BACKGROUND OF THE INVENTION

1. Field of the Invention

The present invention relates to a discharge lamp starting device for starting a discharge lamp in which an illuminant layer is provided on the inner surface of a light-transmitting bulb, and at least one of a pair of electrodes is provided on the outer or inner surface of the bulb, and also relates to an illumination apparatus equipped with the starting device.

2. Description of the Related Art

A conventional discharge lamp starting device of this type is disclosed in, for example, Jpn. Pat. Appln. KOKAI Publication No. 2001-160497 (see FIGS. 1, 2 and 9 and the descriptions related thereto).

In this starting device, the signal output from a booster/driver circuit for driving a switching element in a booster/chopper circuit has a frequency of approximately 100 kHz. This signal is output so that the time required for the switching loss waveform of the switching element to rise or fall will fall within the range of 30 to 200 nsec.

Further, since the switching speed of the switching element is increased to enhance the efficiency of the circuit, the peak loss of the switching element exceeds 200 W.

A description will be given of the time required for the switching loss waveform to rise or fall, and the peak loss, referring to ideal waveforms. Assuming that the switching element is a field effect transistor (FET), the drain-source (D-S) voltage waveform $V_{DS}$ and drain (D) current waveform ID are shown in FIG. 1A. In contrast, FIG. 1B shows the switching loss waveform L of the switching element corresponding to the D-S voltage waveform $V_{DS}$ and D current waveform $I_D$. Of the switching loss waveform L, $L_{on}$ represents the switching loss portion when the switching element is turned on, while $L_{off}$ represents the switching loss portion when the switching element is turned off.

Further, concerning Lon, $T_{up-on}$ represents the rise time, and $T_{down-on}$ represents the fall time. Similarly, concerning $L_{off}$, $T_{up-off}$ represents the rise time, and $T_{down-off}$ represents the fall time. $L_p$ represents the peak loss.

In FIG. 2, "ch1, ch2" represents the drain-source (D-S) voltage waveform $V_{DS}$ and drain (D) current waveform $I_D$, respectively, of an FET 1 that forms the switching element of the booster/chopper circuit of the above-mentioned conventional discharge lamp starting device. As shown, the maximum drain-source (D-S) voltage of the FET 1 is 101 V, and the maximum drain (D) current is 3.76 A.

In FIG. 2, "M1" represents the switching loss waveform of the switching element FET 1. From the switching loss waveform M1, it can be understood that the switching loss $L_{p-off}$ occurring when the switching element is turned off is 262 W (96 MHz), and the switching loss $L_{p-on}$ occurring when the switching element is turned on is 220 W (43 MHz). Neither $L_{p-off}$ nor $L_{p-on}$ satisfies the, radiated noise standards of CISPR CLASS B for information technology equipment (ITE).

FIG. 3 illustrates measured radiated noise corresponding to the above: switching loss waveform. As is shown in FIG. 3, the field strength is 58.2 dBuV/m at 43.500 MHz (indicated by P1) corresponding to the switching loss occurring when the switching element is turned on, and 57.9 dBuV/m at 96.825 MHz (indicated by P2) corresponding to the switching loss occurring when the switching element is turned off.

Thus, the conventional discharge lamp starting device exhibits a very high radiated noise level and terminal noise level. Therefore, if this device is employed in office automation equipment, such as a copy machine, scanner or facsimile machine, the equipment will not satisfy the required electromagnetic noise standards.

BRIEF SUMMARY OF THE INVENTION

It is an object of the invention to provide a discharge lamp starting device producing low levels of radiated noise and terminal noise, which satisfies the electromagnetic noise standards required for office automation equipment when it is incorporated in such equipment.

It is another object to provide an illumination apparatus using the discharge lamp starting device.

The inventor of the present invention has found that if the peak loss of the switching element is limited to 200 W or less, the radiated noise standards of CISPR CLASS B for information technology equipment (ITE) are satisfied.

A discharge lamp starting device according to the invention comprises a discharge lamp driving circuit which drives a discharge lamp using a high frequency wave, and starts the discharge lamp; a booster/chopper circuit having a switching element, the booster/chopper circuit boosting an input power supply voltage by switching the switching element; a boosting transformer which supplies the discharge lamp with a voltage boosted by the booster/chopper circuit; and a booster/driver circuit which supplies the switching element of the booster/chopper circuit with a driving signal having a frequency of 10 to 200 kHz, thereby limiting a peak loss of the switching element to 200 W or less.

A discharge lamp starting device according to the invention comprises a discharge lamp driving circuit which drives a discharge lamp using a high frequency wave, and starts the discharge lamp; a booster/chopper circuit having a switching element, the booster/chopper circuit boosting an input power supply voltage by switching the switching element; a boosting transformer which supplies the discharge lamp with a voltage boosted by the booster/chopper circuit; and a booster/driver circuit which supplies the switching element with a signal such that a time required for a switching loss waveform of the switching element to rise or fall falls within a range of 1 nsec to 1 µsec, a peak loss of the switching element being limited to 200 W or less.

To reduce the peak loss of the switching element to 200 W or less, the capacitor for smoothing the voltage boosted by the switching element may have a capacitance larger than in the conventional cases. Further, to reduce the peak loss of the switching element to 200 W or less, the resistance of a storage time adjusting circuit connected to the control terminal of the switching element may be set larger than in the conventional cases.

An illumination apparatus according to the invention comprises a discharge lamp including a pair of electrodes configured to discharge electricity in a light-transmitting bulb, at least one of the electrodes being provided on an outer surface or an inner surface of the light-transmitting bulb; and the above-described discharge lamp starting device.

As described above, in the discharge lamp starting device and illumination apparatus of the invention, the peak loss of the switching element can be reduced to 200 W or less by supplying a driving signal of 10 to 200 kHz to the switching element of the booster/chopper circuit, or by supplying a signal so that the time required for the switching loss waveform of the switching element to rise or fall will fall within the range of 1 nsec to 1 μsec. As a result, if the discharge lamp starting device or illumination apparatus of the invention is employed in office automation equipment, such as a copy machine, scanner or facsimile machine, the electromagnetic noise standards required for the equipment are satisfied.

The booster/driver circuit incorporated in the discharge lamp starting device of the invention may output a driving signal to the switching element of the booster/chopper circuit, thereby making constant the voltage boosted by the booster/chopper circuit. Making the voltage boosted by the booster/chopper circuit constant prevents the illuminance of the discharge lamp from reduction.

The discharge lamp driving circuit of the discharge lamp starting device of the invention may include two switching elements which perform inverter operations, and a two-transistor driving circuit which drives the two switching elements. Further, the oscillation ON-duty ratio of the signal supplied from the two-transistor driving circuit to the switching element may be set to 35 to 47%. Since the oscillation ON-duty ratio of the signal supplied from the two-transistor driving circuit to the switching element is set to 35 to 47%, reduction of the output voltage of the discharge lamp can be avoided, which means that the discharge lamp can perform stable discharge.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

FIG. 5 illustrates the outward appearance of a discharge lamp employed in the discharge lamp stating device and illumination apparatus according to the invention;

FIG. 6 is a transverse sectional view illustrating the discharge lamp of FIG. 5;

FIG. 7 illustrates a circuit equivalent to the discharge lamp of FIG. 5;

FIG. 10 illustrates output signal waveforms having respective oscillation ON-duty ratios employed in the discharge lamp starting device and illumination apparatus of the invention;

FIG. 11 is a graph illustrating the discharge lamp voltage obtained when control is performed using a signal of a conventional oscillation ON-duty ratio; and FIG. 12 is a graph illustrating the discharge lamp voltage obtained when control is performed using a signal of an oscillation ON-duty ratio employed in the discharge lamp starting device and illumination apparatus of the invention.

DETAILED DESCRIPTION OF THE INVENTION

Figure 1A:
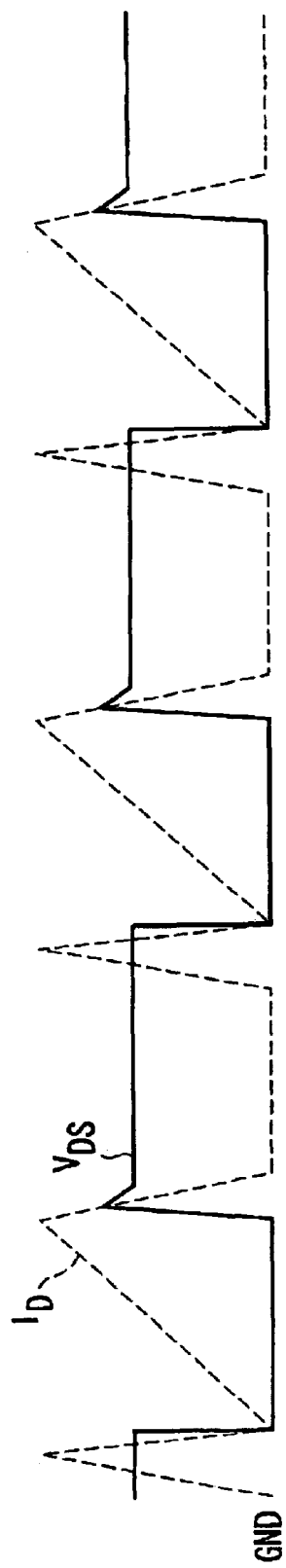
FIG. 1A illustrates the drain-source voltage waveform $V_{DS}$ and drain current waveform $I_D$ of a switching element incorporated in a booster/chopper circuit of a standard structure.
Figure 1B:
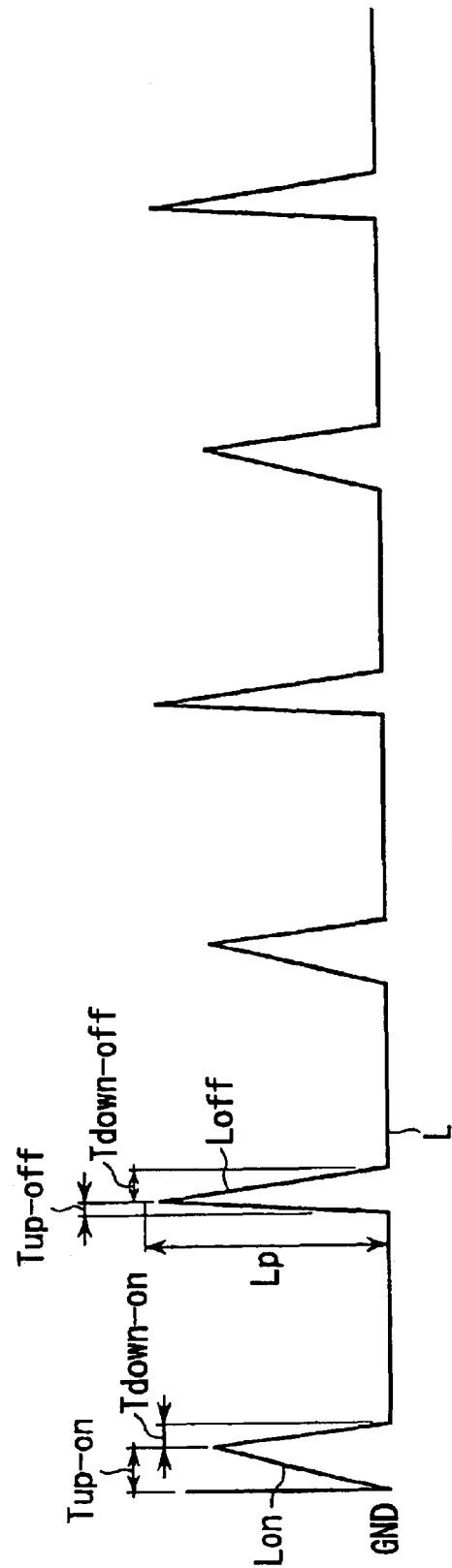
FIG. 1B illustrates the switching loss waveform L of the switching element corresponding to the drain-source voltage waveform VDS and drain current waveform ID of the switching element.
Figure 2:
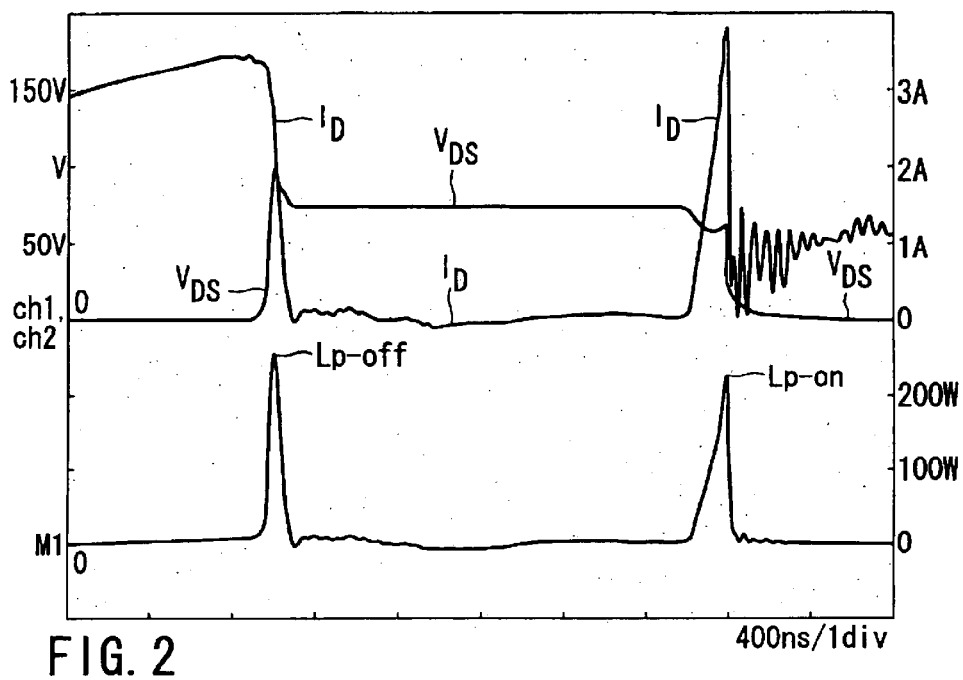
FIG. 2 is a graph illustrating a switching loss waveform corresponding to a drain-source voltage waveform $V_{DS}$ and drain current waveform $I_D$ in a conventional case.
Figure 3:
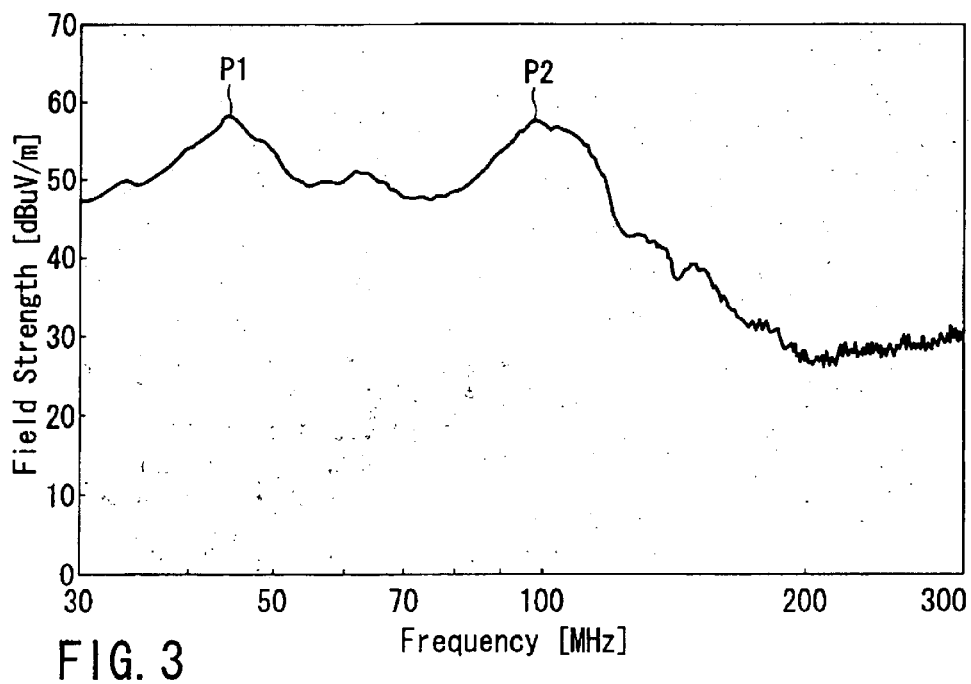
FIG. 3 is a graph illustrating conventional measurement results of radiation noise.
Figure 4:
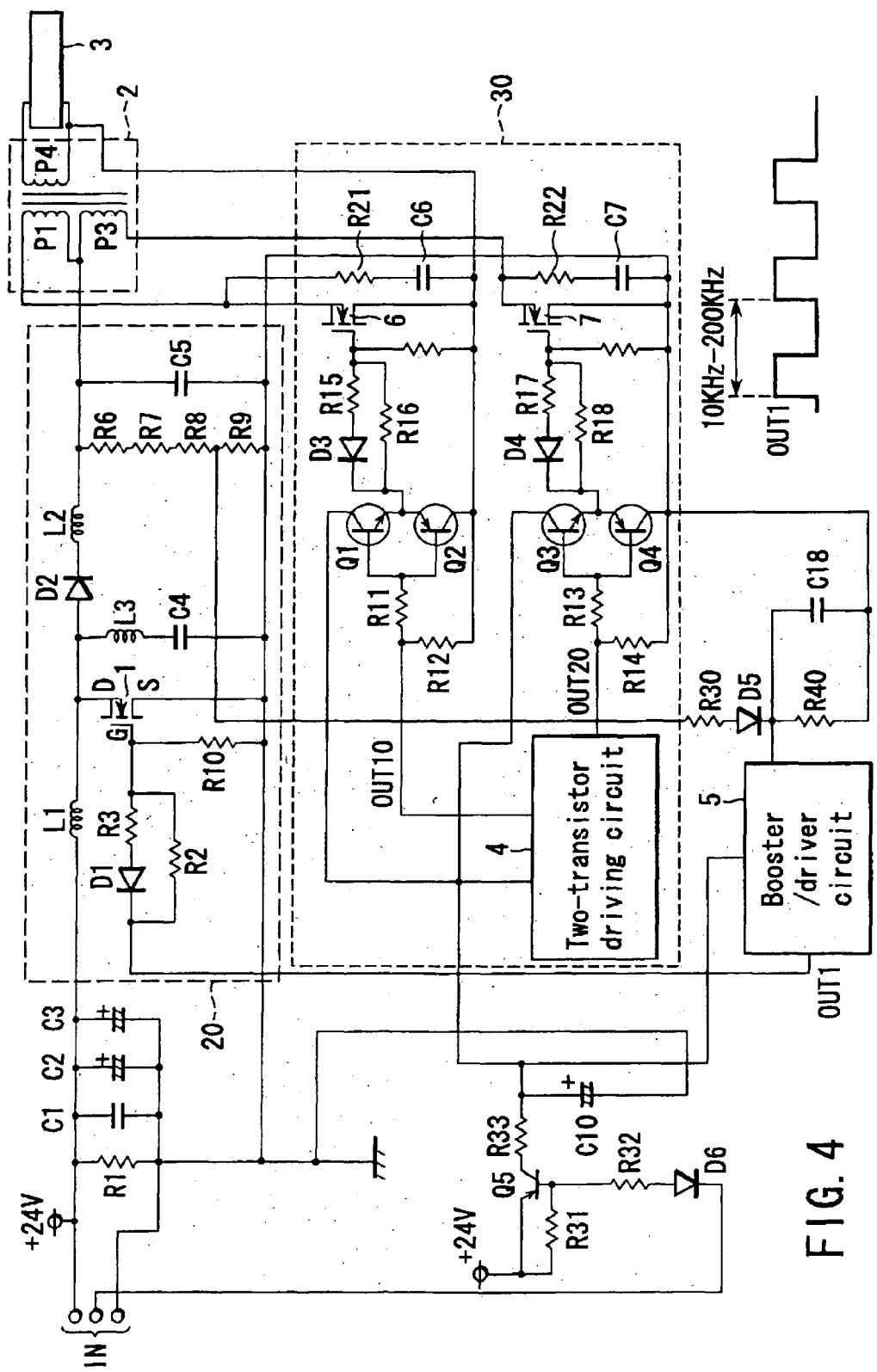
FIG. 4 is a circuit diagram illustrating the structure of a discharge lamp starting device and illumination apparatus according to the invention.

A discharge lamp starting device according to an embodiment of the invention and an illumination apparatus with the device will be described with reference to the accompanying drawings. FIG. 4 shows an illumination apparatus incorporating a discharge lamp starting device that uses a discharge lamp 3 as a load. The discharge lamp 3 comprises a pair of electrodes for discharging electricity in a transparent bulb, at least one of the electrodes being provided on the outer or inner surface of the bulb. An illuminant layer is provided on the inner surface of the bulb, and a rare gas is charged in the bulb. Thus, the discharge lamp 3 has basically the same structure as the previously mentioned discharge lamp disclosed in Jpn. Pat. Appln. KOKAI Publication No. 2001-160497.

As seen from the outward appearance of FIG. 5 and the transverse section of FIG. 6, the discharge lamp 3 comprises a discharge container 11, phosphor layer 12, pair of external electrodes 13, aperture 14, transparent resin sheet 15 and transparent insulation tube 16.

The discharge container 11 is formed of a slender glass bulb 11a that has its opposite ends airtightly sealed, and has a diameter of 10 mm and an effective length of 370 mm. An exhaust chip-off section 11b is provided at one of the ends. Xenon is filled as a discharge medium in the bulb. The phosphor layer 12 is provided on the entire inner surface of the discharge container 11 except for a longitudinal portion shaped like a slit.

The external electrodes 13 are formed of aluminum foil, and are longitudinally adhered to the outer surface of the container 11 in parallel to each other with a certain gap the between, as shown in FIG. 5. The external electrodes 13 are pre-adhered to one surface of the transparent resin sheet 15 described later, and the resin sheet with the electrodes is wound on a predetermined portion of the outer periphery of the discharge container 11.

Further, each external electrode 13 comprises a wave-shaped electrode main section 13a, a terminal connection section 13b and a terminal 13c. The wave-shaped electrode main section 13a extends on a greater longitudinal portion of the discharge container 11. The terminal connection section 13b is connected to an end of the electrode main section 13a, and formed rectangular so that the sections 13a and 13b contact each other over a large area. The terminal 13c is adhered to the terminal connection section 13b by a conductive adhesive, and projects to the outside from the transparent resin sheet 15 and heat-contractive transparent insulation tube 16.

The aperture 14 is formed of the above-mentioned longitudinal portion of the discharge container 11 on which no phosphor layer 12 is provided. Therefore, the interior of the discharge container 11, which is formed of the glass bulb 11a, is seen through the aperture 14.

The transparent resin sheet 15 is made of transparent PET, and has a length covering substantially the entire length of the discharge container 11, and a width sufficient to cover the width of the aperture 14. As described above, the external electrodes 13 are adhered to one surface (i.e. the inner or outer surface) of the discharge container with a predetermined space therebetween, and the resin sheet is adhered to the entire outer surface of the discharge container 11 by an acryl-based adhesive. Thus, the transparent resin sheet 15 is provided on the entire outer surface of the discharge container 11, covering both the external electrodes 13 and the aperture 14.

The transparent insulation tube 16 is made of a transparent fluorocarbon resin, and covers the entire periphery of the discharge container 11 on the external electrodes 13 and aperture section 14.

As seen from FIG. 7, the equivalent circuit of the discharge lamp 3 comprises a series circuit formed of a capacitor CIN1, load-resistor RL and capacitor CIN2, and a parallel circuit formed of capacitors COUT1 and COUT2. The capacitors $C_{IN1}$ and $C_{IN2}$ correspond to capacitances formed between the external electrodes 13 and the inner surface of the discharge container 11. Accordingly, the capacitances of the capacitors $C_{IN1}$ and $C_{IN2}$ are determined from the area of each external electrode 13, the specific inductive capacitance and thickness of glass as the material of the discharge container 11, and the specific inductive capacitance and thickness of the adhesive that adheres the external electrodes 13 to the outer surface of the discharge container 11.

Power is supplied to the discharge lamp 3 constructed as the above by the following route. The input power supply voltage supplied to a power supply terminal IN is accumulated in capacitors C1 to C3. Specifically, when the FET 1 is in the ON state, an energy of $\frac{1}{2}(LI^2)$ is accumulated in a choke coil L1, and when the FET 1 shifts from the ON state to the OFF state, the induction voltage occurring across the choke coil L1 is accumulated into a capacitor C5 via a diode D2 and coil L2. The node between the drain and source of the FET 1 is connected to a series circuit formed of a coil L3 and capacitor C4. When the potential of the capacitor C4 exceeds that of the capacitor C5, the capacitor C4 charges the capacitor C5.

The voltage accumulated across the capacitor C5 is boosted by a boosting transformer 2, and applied to a secondary coil P4 and then to the discharge lamp 3.

On the other hand, a discharge lamp driving circuit 30 for driving the discharge lamp 3 at a high frequency is provided, which comprises FETs 6 and 7 that constitute switching elements, a buffer formed of transistors Q1 and Q2, a buffer formed of transistors Q3 and Q4, two-transistor driving circuit (push-pull circuit) 4, etc. The two-transistor driving circuit 4 and a booster/driver circuit 5, described later, are driven by the power supplied from a power supply formed of a transistor Q5 and capacitor C10.

The two-transistor driving circuit 4 supplies a control signal OUT10 to the buffer, formed of the transistors Q1 and Q2, via a resistor R1, and supplies a control signal OUT20 to the buffer, formed of the transistors Q3 and Q4, via a resistor R13, thereby driving the FETs 6 and 7. As a result, high-frequency waves of a predetermined high frequency are supplied from the primary coils P1 and P3 of the boosting transformer 2 to the discharge lamp 3 via the secondary coil P4, thereby lighting the discharge lamp 3.

In the embodiment, to detect the potential of the smoothing capacitor C5, the capacitor C5 is connected in parallel to a series circuit formed of resistors R6 to R9, and the voltage at the node of the resistors R8 and R9 is rectified by a resistor R30 and diode D5, integrated by a resistor R40 and capacitor C18, and guided to the booster/driver circuit 5.

The booster/driver circuit 5 switches the FET 1 using a driving signal OUT1, so that the integrated voltage will be constant. In the embodiment, the frequency of the driving signal OUT1 is set to 10 to 200 kHz, as is shown in the lower right portion of FIG. 4. The reason why the frequency is set to 10 to 200 kHz is as follows: If the frequency is set less than 10 kHz, the peak loss when the FET 1 is turned off is higher than 200 W, whereas if the frequency is set higher than 200 kHz, the peak loss when the FET 1 is turned on is higher than 200 W. Preferably, the frequency of the driving signal OUT1 is set to 30 to 150 kHz.

For example, in a storage time adjusting circuit formed of a diode D1, connected to the gate (control terminal) of the FET 1, and resistors R2, R3 and R10, if the resistors R2 and R3 are set to have a greater resistance than in the conventional cases, the peak loss can be reduced to 200 W or less.

Further, if the capacitance of the capacitor C4 in the series circuit that is formed of the coil L3 and capacitor C4 and connected in parallel to the FET 1 is set larger than in the conventional cases, the peak loss can be reduced to 200 W or less. Furthermore, if the capacitance of the capacitor C5 for smoothing the voltage boosted by the FET 1 is set larger than in the conventional cases, the peak loss can be reduced to 200 W or less. Thus, at least one of the above conditions is satisfied, the peak loss can be reduced to 200 W or less.

In addition, utilizing a manner similar to that employed to reduce the peak loss, the booster/driver circuit 5 supplies the driving signal so that the rise or fall time of the switching loss waveform of the FET 1 will fall within the range of 1 nsec to 1 μsec.

Figure 8:
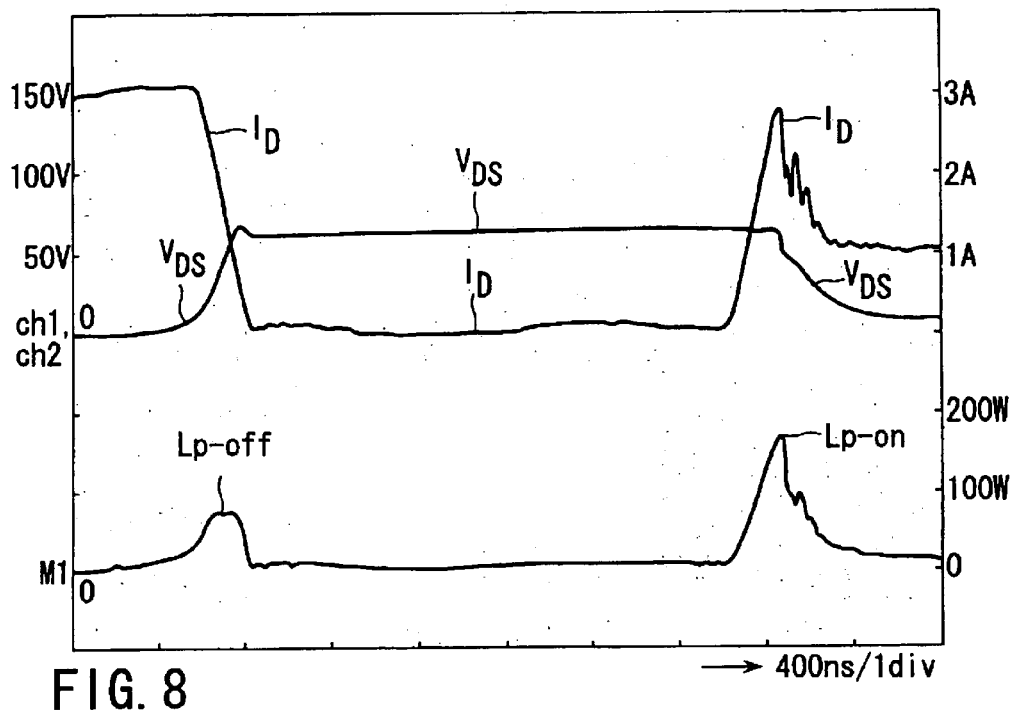
FIG. 8 is a graph illustrating a switching loss waveform corresponding to a drain-source voltage waveform $V_{DS}$ and drain current waveform $I_D$ realized by the discharge lamp starting device and illumination apparatus of the invention.

In FIG. 8, "ch1, ch2" represents the drain-source (D-S) voltage waveform $V_{DS}$ and drain (D) current waveform. $I_D$, respectively, of the above-described FET 1. As shown, the maximum drain-source (D-S) voltage of the FET 1 is 70 V, and the maximum drain (D) current is 3.06 A.

Further, in FIG. 8, "M1" represents the switching loss waveform of the FET 1. From the switching loss waveform M1, it can be understood that the switching loss $L_{p\text{-}off}$ occurring when the FET 1 is turned off is 70 W (96 MHz), and the switching loss $L_{up\text{-}on}$ occurring when the switching element is turned on is 164 W (43 MHz). Both $L_{p\text{-}off}$ and $L_{p\text{-}on}$ are 200 W or less.

Figure 9:
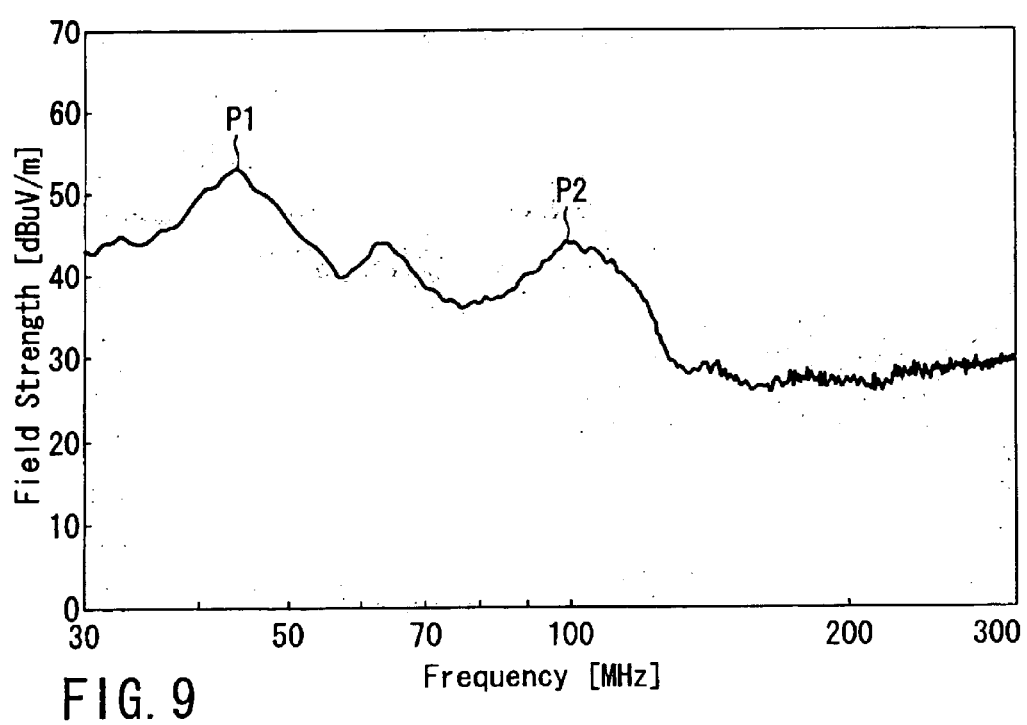
FIG. 9 is a graph illustrating measurement results of radiation noise realized by the discharge lamp starting device and illumination apparatus of the invention.

FIG. 9 illustrates measured radiated noise corresponding to the above switching loss waveform. As is shown in FIG. 9, the field strength is 52.5 dBuV/m at 43.500 MHz (indicated by P1) corresponding to the switching loss occurring when the switching element is turned on, and 42.5 dBuV/m at 96.825 MHz (indicated by P2) corresponding to the switching loss occurring when the switching element is turned off.

These measurement results indicate that if the discharge lamp starting device or illumination apparatus constructed as the above is employed in office automation equipment, such as a copy machine, scanner or facsimile machine, the equipment will satisfy the required electromagnetic noise standards.

As shown in FIG. 10, the oscillation ON-duty ratios of control signals OUT10 and OUT20 are set within the range of 35 to 47%. If the oscillation ON-duty ratio exceeds 47%, the FETs 6 and 7 may be simultaneously turned on and broken Since, for example, they vary in characteristics. Therefore, the maximum oscillation ON-duty ratio is set to 47%.

On the other hand, if the oscillation ON-duty ratio is lower than 35%, the charge accumulated in the discharge lamp 3 dissipates via the boosting transformer as shown in FIG. 11 and its output voltage is lowered, with the result that the lamp 3 may perform inappropriate discharge. Therefore, the minimum oscillation ON-duty ratio is set to 35%.

FIG. 12 shows the discharge lamp voltage VA obtained when the oscillation ON-duty ratio is set to 40%. As shown, the discharge voltage VA of the discharge lamp of the embodiment is 2200 V (pp), which is higher than that (2100 V (pp)) obtained in the conventional cases. Therefore, the discharge lamp 3 can perform stable discharge. Further, if the oscillation ON-duty ratio is set to 40%, the ON time is longer than in the conventional cases, thereby reducing the amount of dissipation, via the boosting transformer 2, of the charge accumulated in the discharge lamp 3. This means that the discharge lamp 3 is prevented from reducing its output voltage, therefore can realize stable discharge.

In the embodiment, control is performed to make constant the voltage boosted by the booster/chopper circuit 20. To detect the potential of the smoothing capacitor C5, the series circuit formed of the resistors R6 to R9 is connected in parallel to the capacitor C5, and the voltage at the node of the resistors R8 and R9 is rectified by the resistor R30 and diode D5, integrated by the resistor R40 and capacitor 18 and guided to the booster/driver circuit 5.

The booster/driver circuit 5 switches the FET 1 using the driving signal OUT1, so that the integrated voltage will be constant. In the embodiment, the frequency of the driving signal OUT1 is set to, for example, 10 to 200 kHz. As described above, since control is performed to make constant the voltage boosted by the booster/chopper circuit, the impedance of the discharge lamp 3 reduces when the temperature of the lamp increases, thereby increasing the voltage of the lamp 3 and suppressing a reduction in the illuminance of the lamp 3 (by about 5%).

Further, even if leakage of current occurs when the discharge lamp 3 is mounted, the power of the lamp 3 is made constant and a reduction in the illuminance of the lamp 3 is suppressed (by about 10%), since the voltage boosted by the booster/chopper circuit is controlled to be constant.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A discharge lamp starting device comprising:
   a discharge lamp driving circuit which drives a discharge lamp using a high frequency wave, and starts the discharge lamp;
   a booster/chopper circuit having a switching element, the booster/chopper circuit boosting an input power supply voltage by switching the switching element;
   a boosting transformer which supplies the discharge lamp with a voltage boosted by the booster/chopper circuit; and
   a booster/driver circuit which supplies the switching element of the booster/chopper circuit with a driving signal having a frequency of 10 to 200 kHz, thereby limiting a peak loss of the switching element to 200 W or less.

2. The discharge lamp starting device according to claim 1, wherein the booster/driver circuit outputs a driving signal to the switching element of the booster/chopper circuit, thereby making constant the voltage boosted by the booster/chopper circuit.

3. The discharge lamp starting device according to claim 1, wherein the discharge lamp driving circuit includes:
   two switching elements which perform inverter operations;
   a two-transistor driving circuit which drives the two switching elements; and
   control means for controlling, to 35 to 47%, an oscillation ON-duty ratio of a signal supplied from the two-transistor driving circuit to the two switching elements.

4. The discharge lamp starting device according to claim 2, wherein the discharge lamp driving circuit includes:
   two switching elements which perform inverter operations;
   a two-transistor driving circuit which drives the two switching elements; and
   control means for controlling, to 35 to 47%, an oscillation ON-duty ratio of a signal supplied from the two-transistor driving circuit to the two switching elements.

5. An illumination apparatus comprising:
   a discharge lamp including a pair of electrodes configured to discharge electricity in a light-transmitting, at least one of the electrodes being provided on an outer surface or an inner surface of the light-transmitting bulb; and
   a discharge lamp starting device as defined in claim 1.

6. An illumination apparatus comprising:
   a discharge lamp including a pair of electrodes configured to discharge electricity in a light-transmitting bulb, at least one of the electrodes being provided on an outer surface or an inner surface of the light-transmitting bulb; and
   a discharge lamp starting device as defined in claim 2.

7. An illumination apparatus comprising:
   a discharge lamp including a pair of electrodes configured to discharge electricity in a light-transmitting bulb, at least one of the electrodes being provided on an outer surface or an inner surface of the light-transmitting bulb; and
   a discharge lamp starting device as defined in claim 3.

8. An illumination apparatus comprising:
   a discharge lamp including a pair of electrodes configured to discharge electricity in a light-transmitting bulb, at least one of the electrodes being provided on an outer surface or an inner surface of the light-transmitting bulb; and
   a discharge lamp starting device as defined in claim 4.

9. A discharge lamp starting device comprising:
   a discharge lamp driving circuit which drives a discharge lamp using a high frequency wave, and starts the discharge lamp;
   a booster/chopper circuit having a switching element, the booster/chopper circuit boosting an input power supply voltage by switching the switching element;

a boosting transformer which supplies the discharge lamp with a voltage boosted by the booster/chopper circuit; and a booster/driver circuit which supplies the switching element with a signal such that a time required for a switching loss waveform of the switching element to rise or fall falls within a range of 1 nsec to 1 μsec, a peak loss of the switching element being limited to 200 W or less.

10. The discharge lamp starting device according to claim 9, wherein the booster/driver circuit outputs a driving signal to the switching element of the booster/chopper circuit, thereby making constant the voltage boosted by the booster/chopper circuit.

11. The discharge lamp starting device according to claim 9, wherein the discharge lamp driving circuit (30) includes:

two switching elements which perform inverter operations;

a two-transistor driving circuit which drives the two switching elements; and control means for controlling, to 35 to 47%, an oscillation ON-duty ratio of a signal supplied from the two-transistor driving circuit to the two switching elements.

12. The discharge lamp starting device according to claim 10, wherein the discharge lamp driving circuit includes:

two switching elements which perform inverter operations;

a two-transistor driving circuit which drives the two switching elements; and control means for controlling, to 35 to 47%, an oscillation ON-duty ratio of a signal supplied from the two-transistor driving circuit to the two switching elements.

13. An illumination apparatus comprising:

a discharge lamp including a pair of electrodes configured to discharge electricity in a light-transmitting bulb; at least one of the electrodes being provided on an outer surface or an inner surface of the light-transmitting bulb; and a discharge lamp starting device as defined in claim 9.

14. An illumination apparatus comprising:

a discharge lamp including a pair of electrodes configured to discharge electricity in a light-transmitting bulb, at least one of the electrodes being provided on an outer surface or an inner surface of the light-transmitting bulb; and a discharge lamp starting device as defined in claim 10.

15. An illumination-apparatus comprising:

a discharge lamp including a pair of electrodes configured to discharge electricity in a light-transmitting bulb, at least one of the electrodes being provided on an outer surface or an inner surface of the light-transmitting bulb; and a discharge lamp starting device as defined in claim 11.

16. An illumination apparatus comprising:

a discharge lamp including a pair of electrodes configured to discharge electricity in a light-transmitting bulb, at least one of the electrodes being provided on an outer surface or an inner surface of the light-transmitting bulb; and a discharge lamp starting device as defined in claim 12.

* * * * *